United States Patent [19]

Schlag et al.

[11] Patent Number: 4,876,147
[45] Date of Patent: Oct. 24, 1989

[54] CABLE INSULATION BASED ON ETHYLENE POLYMERS HAVING HIGH RESISTANCE TO THE FORMATION OF WATER TREES

[75] Inventors: Johannes Schlag; Ernst Koehnlein; Peter Bauer, all of Ludwigshafen; Ludwig Koessler, Gruenstadt; Alfred F. Hausz, Ludwigshafen, all of Fed. Rep. of Germany

[73] Assignee: BASF Aktiengesellschaft, Ludwigshafen, Fed. Rep. of Germany

[21] Appl. No.: 22,137

[22] Filed: Mar. 5, 1987

[30] Foreign Application Priority Data

Mar. 8, 1986 [DE] Fed. Rep. of Germany ....... 3607757

[51] Int. Cl.$^4$ ...................... B32B 27/28; B32B 15/08; C08L 53/02; C08L 23/04
[52] U.S. Cl. ..................................... 428/379; 525/98; 525/232; 524/505; 524/525
[58] Field of Search ................... 525/98, 232; 428/379

[56] References Cited

U.S. PATENT DOCUMENTS

| | | | |
|---|---|---|---|
| 3,299,174 | 1/1967 | Kuhre et al. | 525/261 |
| 3,459,830 | 8/1969 | Legge et al. | 525/261 |
| 3,792,124 | 2/1974 | Davison et al. | 525/98 |
| 4,020,025 | 4/1977 | Zeitler et al. | 525/98 |
| 4,101,498 | 7/1978 | Snyder | 525/98 |
| 4,102,854 | 7/1978 | Gergen et al. | 525/98 |
| 4,250,273 | 2/1981 | Bohm et al. | 525/232 |
| 4,252,914 | 2/1981 | Halasa et al. | 525/98 |
| 4,479,989 | 10/1984 | Mahal | 525/98 |
| 4,503,187 | 3/1985 | Gunesin et al. | 525/98 |
| 4,582,871 | 4/1986 | Noro et al. | 525/98 |

FOREIGN PATENT DOCUMENTS 2436770 2/1976 Fed. Rep. of Germany .

OTHER PUBLICATIONS

Chem. Abstr. 103:7802.
Chem. Abstr. 92:7572.

*Primary Examiner*—Carman J. Seccuro
*Attorney, Agent, or Firm*—Keil & Weinkauf

[57] ABSTRACT

Cable insulation having high resistance to the formation or growth of water trees and high aging resistance consists of an ethylene polymer and from 0.5 to 20 percent by weight of a styrene copolymer, which is a styrene/diene copolymer in which not less than 90% of the olefinic double bonds have been hydrogenated.

5 Claims, No Drawings

CABLE INSULATION BASED ON ETHYLENE POLYMERS HAVING HIGH RESISTANCE TO THE FORMATION OF WATER TREES

The present invention relates to cable insulation which has high resistance to the formation or growth of water trees and good aging resistance and consists of an ethylene polymer and from 0.5 to 20% by weight, based on the ethylene polymer, of a styrene copolymer and conventional additives in the usual amounts.

In insulation of this type consisting of ethylene polymers for electrical cables and lines, water trees may form where field strengths and moisture are present simultaneously. These water trees are considered to weaken the insulation and therefore have to be avoided by suitable additives.

There are a large number of proposals for avoiding or reducing the danger of water trees, these proposals relating to the composition or the addition of agents which retard the formation of water trees.

For example, DE-A-29 48 492 discloses that the polyolefin material intended for cable insulation can be washed with water after granulation and directly before extrusion, in order to remove the small amounts of water-soluble and hygroscopic salts which cause the water trees (cf. also DE-A-29 11 756). The disadvantage of this known method is the relatively complicated procedure, since the granules have to be dried with hot air after the washing process.

It has also been disclosed that water tree inhibitors based on polymeric materials can be added to the polyolefin cable material before the latter is produced. For example, the following are recommended for this purpose in the literature: organopolysiloxanes (cf. US-A-4 492 647 and 4 536 530 and EP-A-109 797), polyethylene glycols (cf. EP-A-57 604), epoxy resins (cf. Chem. Abstr. 96: 182235), ethylene/but-1-ene or hex-1-ene copolymers (cf. Chem. Abstr. 101: 193825), polypropylene (cf. Chem. Abstr. 102: 8329), polybut-1-ene (cf. Chem. Abstr. 98: 5097), ethylene/vinyl acetate copolymers (cf. US-A-4 092 488), polystyrene and triallyl isocyanurate (cg. DD-A-160 808), ethylene/vinyl acetate or ethylene/alkyl acrylate copolymers grafted with styrene (cf. Chem. Abstr. 103: 7802), polyvinyl alcohols (cf. Chem. Abstr. 95: 204983), chlorosulphonated polyethylene (cf. Chem. Abstr. 95: 204981), nylon (cf. Chem. Abstr. 96: 21007) or a styrene copolymer, eg. styrene/butadiene or styrene/isoprene rubber (cf. Chem. Abstr. 92: 7572 and Annual Convention of the Wire Association in Baltimore, U.S.A., reprint of paper, November 1984, ETR No 3A-1995).

For the known polyolefin cable materials described above and containing added polymeric water tree inhibitors, the effects and the influence on water tree growth differ very greatly, and quantitative information is lacking in most cases. In many cases, the additives have an adverse effect on the homogeneity of the polyolefin cable material and on the aging resistance of the insulating material.

It has also been disclosed that insulating material which is based on polyolefins and copolymers of styrene with butadiene monomers and has been stabilized to electric stress can be used (cf. DE-A-24 36 770). This material is stabilized to voltage stress, ie. the formation of electrical discharge channels should be delayed or prevented (electrical treeing) and the ionization voltage under the action of an electric field should therefore be increased. The above applies with regard to the adverse effects on the aging properties.

It is an object of the present invention to avoid the disadvantages stated at the outset and to provide cable insulation based on ethylene polymers which are both highly resistant to the formation or growth of water trees and homogeneous and possess high resistance to aging.

We have found that this object is achieved by cable insulation as claimed in the claims.

Electric cable and line insulation consisting of ethylene polymers is well known. It is important that the insulating material has various physical, mechanical and electrical properties which make it suitable for specific applications in the cable industry. In the present case, the particular intention is to improve the resistance to the formation of water trees so that, when the ethylene polymer used is one in which it has been technically impossible to avoid contamination by water-soluble salts, the life of the insulation under voltage stress in the presence of water or moisture is increased compared with untreated material. Since the admissible conductor temperature is 90° C., good aging resistance, ie. long-lasting resistance to thermal oxidation and deterioration of the mechanical properties should also be ensured.

For the purposes of the present invention, ethylene polymers are ethylene homopolymers and copolymers. Ethylene polymers of this type are so well known that further description is unnecessary. Particularly suitable ethylene polymers are low density polyethylenes (less than 0.934 g/cm$^3$ according to DIN 53,479), ethylene/vinyl acetate copolymers, preferably those containing from 0.5 to 8% by weight of vinyl acetate as copolymerized units, and ethylene/acrylate copolymers, in particular ethylene/ethyl, n-butyl, tert-butyl or ethylhexyl acrylate and similar ethylene acrylate copolymers. In the uncrosslinked state, the ethylene polymers preferably have a melt flow index of from 0.2 to 10 g/10 min, measured according ASTM-D 1238-70 at 190° C. and under a load of 2.16 kg, and densities of from 0.890 to 0.934 g/cm$^3$, measured according to DIN 53,479. Instead of the pure ethylene homopolymers or copolymers, mixtures of different ethylene polymers are also suitable. Ethylene polymers of this type, their properties and their preparation are described in, for example, Ullmanns Encyklopadie der technischen Chemie, 4th edition, volume 19, Verlag Chemie GmbH, D-6940 Weinheim, 1980, page 169–195; Kunststoffe 67 (1977), 118–121, and U.S. Pat. Nos. 3,117,953 and 4,217,431. The ethylene polymers may be crosslinked or uncrosslinked but are preferably from 50 to 90% crosslinked, either by peroxides or high energy radiation.

The ethylene polymers contain from 0.5 to 20, preferably from 2 to 10, in particular from 4 to 8, % by weight of a styrene copolymer, the percentages being based on the weight of the ethylene polymer. The styrene polymer is mixed with the ethylene polymer in a conventional mixer by one of the usual methods.

The mixture of ethylene polymer and styrene copolymer also contains conventional additives in the usual amounts. Conventional additives are, in particular, antioxidants, flameproofing agents, crosslinking assistants, such as triallyl cyanurate, and crosslinking agents, such as organic peroxides, in amounts of from 0.5 to 3.0% by weight, based on the mixture.

According to the invention, the styrene copolymer should be a styrene/diene copolymer in which not less than 90% of the olefinic double bonds have been hydrogenated. Suitable dienes are aliphatic hydrocarbons having two olefinic double bonds, of the general formula $C_nH_{2n-2}$. Hydrogenated styrene/diene copolymers of this type are known per se and are described in, for example, DE-A-31 06 959. Styrene/diene copolymers in which not less than 95% of the olefinic double bonds have been hydrogenated are preferred. Hydrogenated copolymers of styrene and butadiene can be prepared by copolymerization of styrene and butadiene with a lithiumalkyl initiator in the presence of tetrahydrofuran or a (cyclo)aliphatic hydrocarbon, followed by hydrogenation with hydrogen in the presence of a transition metal catalyst under from 5 to 30 bar and at from 50° to 200° C. (cf. also DE-C-24 14 872 and DE-A-20 27 841). Suitable dienes are butadiene, isoprene, pentadiene, dimethylbutadienes, etc. Butadiene and isoprene are preferred, the former being particularly preferred. The hydrogenated styrene copolymers preferably have a weight average molecular weight of from 40,000 to 1,000,000, in particular from 80,000 to 500,000, determined from the solution viscosity, measured in toluene at 25° C. The hydrogenated styrene copolymer preferably contains from 5 to 60 percent by weight of styrene and 95 to 40 percent by weight of a diene and a hydrogenated diene as copolymerized units. A particularly preferred hydrogenated styrene copolymer is a block copolymer in which the different monomers are not randomly distributed in the chain but bonded to one another in the homopolymeric chain segments of the different monomers.

The particular advantage of the invention is that it provides a homogeneous cable material based on ethylene polymers which both inhibits the formation or growth of water trees and has high resistance to aging.

EXAMPLE 1

Low density polyethylene having a melt flow index of 2 g/10 min and a density of 0.918 g/cm³ is treated with 0.3% by weight of 4,4'-thiobis-(6-tert-butyl-3-methylphenol) as a heat stabilizer and 1.8% by weight of dicumyl peroxide as a crosslinking agent.

This formulation is used to produce 1 mm thick pressed sheets at 130° C., the polyethylene not being crosslinked.

To test for water trees, sodium chloride in the form of small crystals (edge length 10 μm) is finely distributed as a layer in the polyethylene. This is done by dusting the salt onto the uncrosslinked sheet, then placing a second sheet of this type on top and pressing this sandwich to a thickness of 1 mm at 200° C. for 10 minutes. The polyethylene is crosslinked during this procedure.

The samples produced in this manner are stored in water for one week at room temperature. Thereafter, they are subjected to a field strength of 2.5 kV/mm at 100% atmospheric humidity.

After having been subjected to the electric stress, the number, length and structure of the resulting water trees in the individual samples are determined under an optical microscope. The number of water trees is determined in the beam path parallel to the direction of the electric field to which the sample was exposed.

The number of water trees formed is related to the number of NaCl crystals and stated as an amount in % by weight in the table. The length of the water trees is determined in about 0.5 mm thick sections through the sample, the viewing direction being at right angles to the direction of the electric field.

To determine the aging resistance, pressed sheets are freely suspended in a through circulation dryer at 150° C. The time taken for clearly visible embrittlement to appear is regarded as a measure of the aging resistance.

EXAMPLE 2

90 parts of low density polyethylene as described in Example 1 are mixed, in the melt, with 10 parts of a styrene/butadiene/styrene block copolymer having a weight average molecular weight of about 100,000 (Cariflex 1101) to give a homogeneous mixture, and the mixture is treated with a heat stabilizer and crosslinking agent as described in Example 1.

Testing is carried out as in Example 1. The result is shown in the Table.

EXAMPLE 3

90 parts of low density polyethylene as described in Example 1, are mixed, in the melt, with 10 parts of a styrene/butadiene copolymer consisting of 55% by weight of styrene and 45% by weight of butadiene to give a homogeneous mixture, the unsaturated moieties of the said copolymer being saturated by hydrogenation and the weight average molecular weight of the said copolymer being about 120,000. This mixture is treated with a heat stabilizer and crosslinking agent as described in Examples 1 and 2.

Testing is carried out as in Examples 1 and 2. The result is shown in the Table.

TABLE

| | Mixture | | | Water Tree | | Aging Air 150° C. |
|---|---|---|---|---|---|---|
| | | | | 7 days | 80 days | |
| Example | LDPE % by weight | SBS % by weight | SBH % by weight | amount/ length %/μm | amount/ length %/μm | Days to destruction |
| 1 | 100 | — | — | 50/100 | 95/900 | 30 |
| 2 | 90 | 10 | — | none | none | 5 |
| 3 | 90 | — | 10 | none | none | 30 |

LDPE = low density polyethylene
SBS = styrene/butadiene/styrene block copolymer (Cariflex 1101)
SBH = hydrogenated styrene/butadiene copolymer The table shows that superior properties in terms of water tree formation and aging resistance are obtained when the hydrogenated butadiene/styrene copolymer is used.

We claim:

1. A cable having a cable insulation having high resistance to the formation or growth of water trees and high aging resistance and consisting of an ethylene polymer having a melt flow index of from 0.2 to 10 g/10 min and densities of from 0.890 to 0.934 g/cm 3 and from 2 to 10 percent by weight, based on the ethylene polymer, of a styrene copolymer and conventional additives selected from the group consisting of antioxidants, flameproofing agents, cross-linking assistants and crosslinking agents, wherein the styrene copolymer is a styrene/diene copolymer in which not less than 90% of the olefinic double bonds have been hydrogenated.

2. The cable insulation as defined in claim 1, wherein the styrene copolymer is a hydrogenated styrene/butadiene or styrene/isoprene copolymer.

3. The cable insulation as defined in claim 1, wherein the hydrogenated styrene copolymer has a molecular weight of from 40,000 to 1,000,000, determined from the solution viscosity, measured in toluene at 25° C.

4. The insulation as defined in claim 1, wherein the hydrogenated styrene copolymer contains from 5 to 60 percent by weight of styrene and from 95 to 40 percent by weight of a diene and a hydrogenated diene as copolymerized units.

5. The cable insulation as defined in claim 1, wherein the hydrogenated styrene copolymer is a block copolymer.

* * * * *